March 3, 1964 R. S. WASHBURN 3,122,958
SLITTER BAND STRUCTURE WITH HARDENED CUTTING EDGE
Filed Aug. 9, 1960
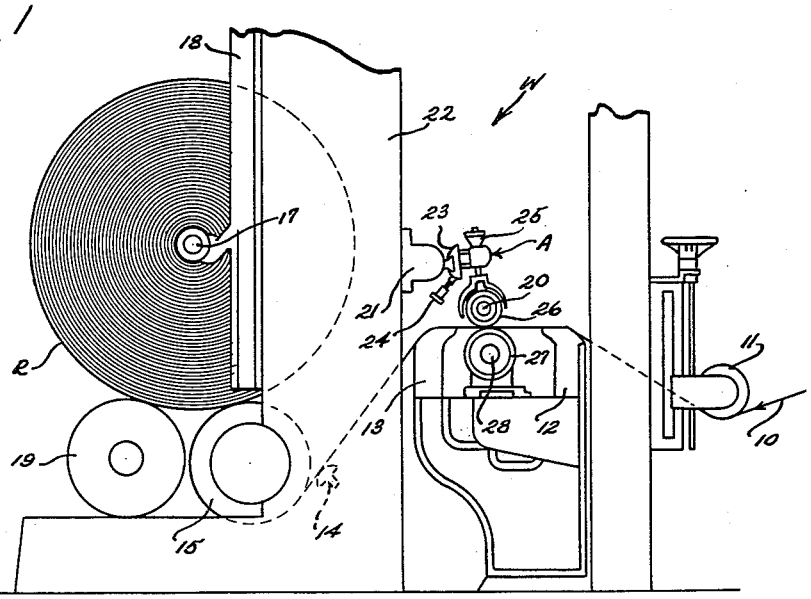
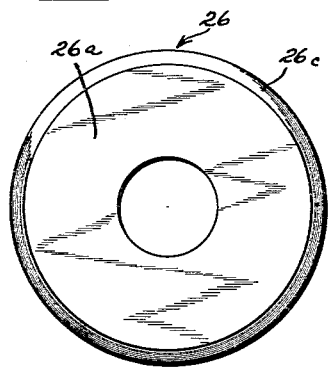
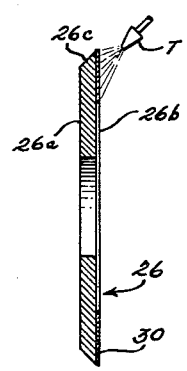
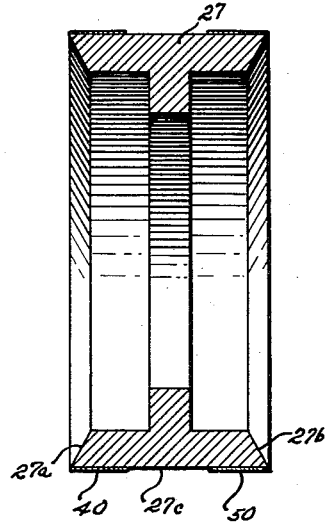
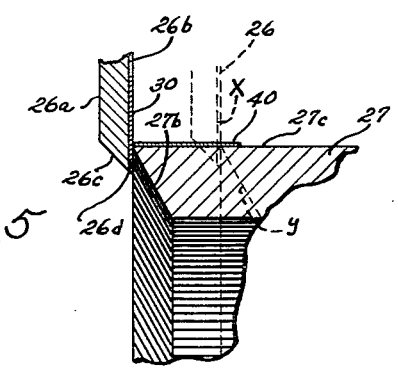
Inventor
ROBERT S. WASHBURN
By Hill, Sherman, Meroni, Gross & Simpson Attys.

United States Patent Office 3,122,958
Patented Mar. 3, 1964

3,122,958
SLITTER BAND STRUCTURE WITH HARDENED CUTTING EDGE
Robert S. Washburn, Beloit, Wis., assignor to Beloit Iron Works, Beloit, Wis., a corporation of Wisconsin
Filed Aug. 9, 1960, Ser. No. 48,408
6 Claims. (Cl. 83—500)

The present invention relates broadly to the art of shearing sheet materials, and is more particularly concerned with rotary slitter apparatus embodying a pair of opposed shearing surfaces, at least one of which is provided with a flame-plated coating characterized by high resistance to wear, abrasion and erosion.

Slitting apparatus of the kind known as "shear slitters" employed on paper winders and the like generally comprise a pair of vertically opposed shearing surfaces between which the sheet or web is passed, and which cut the sheet into a desired width during travel from a parent roll to a rewind roll. The shearing surfaces are customarily referred to in the art as top and bottom slitter bands, and in the construction to which this invention particularly relates, the slitter bands take the form of a pair of rotating discs which slightly overlap one another.

It has been the practice in the art to fabricate the slitter bands of tool steels or related hardened steels, and particularly with respect to the bottom disc, effective accomplishment of the shearing function requires that it be precisely ground or machined for concentricity, fit and squareness upon the supporting rotating shaft. Tool or high-speed steels are inherently difficult to machine, resulting in relatively high costs, and if the bottom slitter does not receive a precise final grinding, concentricity is absent and the slitter band has a variable surface speed at different locations on the outer diameter, causing what may be termed a "wobble" of the bottom slitter on its rotating shaft. This condition cannot be tolerated, since it results in a tapered appearance along the roll ends at the line of split of the rewind roll. The roll ends visibly are not cut in the same plane along their radii, and this constitutes a cause of rejection of the product.

Additional problems exist in the use of the presently employed slitter structures. First, the top and bottom slitter bands must at all times be precisely angularly related one to the other, and as the shearing surfaces wear, adjustments are required. Such adjustments must be precisely made, are accordingly, time-consuming, and during their performance the winding apparatus must be shut down. Second, keen shearing edges must at all times be utilized, which necessitates rather frequent regrinding of the slitter bands.

It is accordingly an important aim of the present invention to provide new and improved rotary slitter apparatus.

Another object of this invention lies in the provision of a slitter band structure featuring on or adjacent its shearing surface a flame-plated coating characterized by extremely good resistance to wear, abrasion and erosion.

Still another object of the instant invention is to provide rotary slitter apparatus embodying a pair of slitter members, at least one of said members carrying on or adjacent its periphery a relatively thin layer of a material selected from the group consisting of tungsten carbide and aluminum oxide.

An even further object of the present invention is to provide a slitter disc of the foregoing character formed of plain carbon steel provided with an abrasion resistant coating of tungsten carbide or aluminum oxide.

Other objects and advantages of the invention will become more apparent during the course of the following description, particularly when taken in connection with the accompanying drawings.

In the drawings, wherein like numerals designate like parts throughout the same:

FIGURE 1 is a fragmentary, more or less diagrammatic end elevational view of an exemplary form of winding apparatus with which the slitter device of this invention may be employed;

FIGURE 2 is an end view of a top slitter band coated in accordance with the principles of this invention;

FIGURE 3 is a vertical sectional view of the slitter band of FIGURE 2, and showing the application of an abrasion resistant coating thereto;

FIGURE 4 is a vertical sectional view of a bottom slitter band as employed in FIGURE 1, and incorporating a wear resistant layer on the periphery thereof; and FIGURE 5 is a fragmentary sectional view of a slitter assembly, showing the relative positioning of the top and slitter members, and indicating by phantom lines the manner in which the bottom slitter may be reground while still leaving sufficient remaining coating for proper performance of the shear slitting function.

Referring now to the drawings, there is shown in FIGURE 1 a known form of paper winder designated generally by the legend W, and illustrative of an exemplary environment for slitting apparatus A of this invention. As is known, a paper web or sheet 10 is directed from a reel spool or parent roll (not shown) under an adjustable lead-in roll 11 to a pair of slitter guard rolls 12 and 13 which guide the sheet 10 and change the direction of travel thereof from the lead-in roll 11 to roll 15, and establish a generally horizontal plane for the sheet 10 during movement through the slitting apparatus A. After being slit, the sheet is contacted by an adjustable D-spreader bar 14 functioning to spread the sheet along the slit line, and thereafter the severed or slit sheet wraps a roll 15 and is wound onto a plurality of rewind cores 17 removably mounted by uprights 18. Rewound roll R formed upon the core 17 is generally supported by a roll 19, and of course, the winder apparatus W embodies other structure not essential to an understanding of the instant invention, and which for this reason has been eliminated from the illustrative presentation of FIGURE 1.

The slitting apparatus A also embodies certain structural details which form no part of the instant invention, and in the exemplary form of slitter structure shown, it is sufficient to point out that the apparatus A may be mounted by a non-rotating cross beam 21 attached to the winder stand 22. To further support the slitter A, there is provided clamp means 23 and bolt means 24 to fix the position of the clamp means relative to the beam structure 21, and as well the apparatus A includes adjusting means 25 to control the amount of overlap between a top slitter member 26 and a bottom slitter member 27.

The top or first slitter blade or member 26 is supported by shaft means 20, and said member may take the form of an essentially flat disc (FIGURES 2 and 3) having opposed surfaces 26a and 26b connected by a tapered or conical peripheral surface 26c which provides a shearing edge with the peripheral portion of the surface 26b. The shearing edge thereby provided is identified in the drawings by the numeral 26d, and upon this edge and extending radially inwardly therefrom is a coating or layer 30 of a dense, extremely hard and abrasion resistant material. Illustrative materials and a preferred mode of application will be specifically described in the succeeding paragraphs.

The lower or second slitter member or band 27 is of generally cylindrical configuration, and is provided at opposite ends with circumferential shearing edges or surfaces 27a and 27b vertically inclined or cut at an angle relative to the axial centerline of the slitter member 27. The slitter member 27 is co-rotatably mounted upon shaft means 28, and is secured thereto in any suitable manner. The shaft means 28 supports a plurality of shearing or slitter bands 27 spaced transversely of the paper web 10, and the shaft is driven for high-speed rotation by suitable motor means (not shown). Generally, the top slitter band 26 is not positively driven, but rotates by action of the moving sheet 10, although the top slitter band can of course also connect to drive means.

The lower slitter member 27 is provided with a straight-walled outer periphery or outer diameter 27c and firmly bounded to the surface 27c axially inwardly a suitable distance from the shearing surfaces 27a and 27b are coatings 40 and 50, constituting axially spaced annular bands of abrasion resistant material preferably of the same composition and applied in the manner of the coating 30 on the top slitter band 26.

The materials providing the layers or coatings 30, 40 and 50 are preferably aluminum oxide or tungsten carbide, although those versed in the art of abrasion resistant coatings will appreciate that equivalent inorganic compounds exist which fulfill the purposes of this invention. The tungsten carbide is at present the optimum material, and the carbide is applied by deposition methods employing a torch which produces and controls a high velocity inert gas stream having a temperature of the order of 20,000° F. The hot gas stream melts and accelerates to high velocity the solid inorganic material without decomposition thereof. The molten particles strike the slitter band surfaces with an impacting action to form a dense and high purity coating. The spark-deposited carbide surface is apparently not continuous, but is in the form of a series of tiny spheres and shallow craters lined with tungsten carbide. Commercially available processes are suitable for the instant purposes, and one procedure productive of good results is identified as the "Plasmarc" plating process by Linde Company, a Division of Union Carbide Corporation.

In a typical rotory slitter apparatus of the character identified by the legend A in FIGURE 1, the top slitter band has an outer diameter of eight inches and the bottom slitter band an outer diameter of nine and one-half inches or more. A top slitter band of the stated diametral dimension is generally three-thirty seconds inches as measured between the side faces 26a and 26b, while the width of a lower slitter band 27 of the mentioned diameter is generally about two inches. Illustratively, the coating 30 applied to the top slitter band 26 extends approximately one and one-half inches from the shearing edge 26d radially inwardly, while the width of the coatings 40 and 50 on the bottom slitter band 27 may be about one-half inch in width for each coating. A desirable thickness for the coatings 30, 40 and 50 in the instant application is approximately 0.001 inch, and as was earlier indicated, the preferred applicator means embodies a torch, as diagrammatically illustrated in FIGURE 3 and designated therein by the legend T.

By utilization of a highly tenacious, hard and abrasion resistant coating as herein described, it is now possible to fabricate the slitter bands 26 and 27 of a plain carbon steel, customarily also referred to as an ordinary or straight steel. A steel of this character is well known to the art, and as is understood this type steel owes its properties chiefly to the presence of carbon, without substantial amounts of other alloying elements. A straight carbon steel for slitter applications is quite by contrast to the medium or high alloy tool or high-speed steels heretofore employed. Tool steels or other similar steels embodying as alloying elements one or more so-called hardeners renders machining of the slitter bands extremely difficult, making the grinding or machining operation time-consuming and accordingly expensive. Precise machining or grinding is of course necessary since, as was earlier indicated, an absence of concentricity, fit and squareness prevents the accomplishment of proper shearing. This is particularly the case with the bottom slitter, and if a precisely accurate final grinding is not accomplished on a portion of either of the surfaces 27a or 27b, a variable surface speed results. The lower band 27 and its supporting shaft 28 of course rotate at the same speed, and if the slitter band 27 is not concentric on its outer diameter, there occurs a wobble or lateral movement of the cutting edges 27a or 27b, depending upon which surface is in shear engagement with the top slitter.

Such lateral movement or alternate shifting of the lower shear surfaces relative to the plane of the moving sheet produces an irregular slit line along the length of the traveling sheet, so that it is not only extremely difficult to break the rewind roll along the one or more slit lines, but by further reason of the irregularity of the cut, the split roll ends are uneven throughout the radius of the roll, which is a cause of rejection of the product.

However, by employing a plain carbon steel, the initial cost of the slitter bands is reduced, and since straight carbon steels are characteristically low in or void of hardeners, their machineability is substantially better. Thus, the original grinding and re-grinding times are markedly reduced. Further, since by employment of the abrasion resistant coatings 30, 40 and 50 the cutting surfaces remain in keen shear for a longer period of time, winder down-time is also reduced and re-grinding costs lowered to a minimum. As well, and by reason of increased life between sharpenings, much less frequent adjustments of the top slitter band relative to the bottom slitter band are necessary.

The latter feature may be more clearly understood by reference to FIGURE 5, wherein it may be noted that the top slitter is provided with the coating 30 and the lower slitter with the coating 40. By protecting the shearing edge 26d by the coating 30, wear thereon is of course reduced, but more importantly, numerous re-grindings of the surface 26c can be performed while still retaining the abrasion resistant properties of the coating 30. The phantom line presentation of the top slitter is indicative of the condition thereof after successive re-grindings, and it may be noted as indicated by the legend "x" that a substantial radial width of coating still remains.

As well, and as also appears in FIGURE 5, numerous re-grindings of the bottom slitter 27 may be performed without loss of the wear resistant function of either of the coatings 40 or 50. The re-grinding is of course done on either of the surfaces 27a or 27b, and such re-grinding upon successive occasions might well cut back the surface 27a to the point indicated at "y." However, here again sufficient coating 40 remains to markedly improve the wear resistance of the shearing edge 27a. And of equal importance is the fact that during continuous slitting the plain carbon steel base underlying the coating 44 progressively wears at a much more rapid rate than the coating 40, so that a fine shearing edge is always maintained at the point of intersection of the surfaces 27a and 27c. In this manner also the time between re-grindings is substantially lengthened.

Another important advantage of the instant invention results particularly in its use with lower slitter bands of the two-piece type. Such slitter bands are employed in a series spaced along a continuous shaft, and the bands prior to location on the shaft are split diametrically. After proper positioning on the shaft, however, the two band halves are abutted and secured one to the other by bolt means or the like.

Tool steels have been employed for the two-part slitter band, and one procedure is to sever the band into the two halves before hardening. However, when the slitter band is hardened, subsequent to finishing all surfaces and bolting the two halves together, substantial warpage occurs, and it is then necessary to finish grind the entire structure. This obviously is most time consuming, bearing in mind the preciseness required. On the other hand, if the slitter band is severed into two halves after hardening, substantial material is lost along the line of severance and the two halves do not then fit properly when bolted upon the driving shaft. As well, it is most likely that the assembled halves will be out of balance, and effective performance of the slitting function will not be accomplished.

These problems are herein eliminated by utilization of a plain or straight carbon steel not requiring hardening or heat treatment in the manner of high-speed tool steels. In addition to easier machineability, the lack of necessity of hardening removes the warpage problem, and a highly satisfactory product is obtained at markedly reduced cost.

Various modifications may of course be practiced in the structures herein disclosed without departing from the novel concepts of the instant invention.

I claim as my invention.

1. A machine for slitting at high speed a continuously travelling paper web comprising,
   a circular slitter blade with a radial planar side surface and a bevelled surface inclined radially inwardly away from said side surface,
   a thin hard layer of abrasion resistant material surface bonded to said side surface and extending in a uniform thickness layer to the edge thereof to form a cutting edge where the side surface meets the bevelled surface, means for rotatably supporting the slitter blade,
   a cylindrical slitter band having a cylindrical outer surface and an axially inwardly bevelled end surface,
   a thin hard layer of abrasion resistant material surface bonded to said outer surface and extending in a uniform thickness layer to the edge thereof to form a cutting edge where the cylindrical surface joins the bevelled end surface,
   means for rotatably supporting the slitter band on an axis parallel to the slitter blade with the cutting edges overlapping for slitting the travelling web with said cylindrical surface providing a support for a web moving tangent thereto,
      said bevelled edges of said slitter blade and said band formed of a relatively soft material for wearing away with rotation of the blade and band and the action of the cut edges of the paper web to maintain a sharp cutting edge at the edge of said hard layers on the blade and band and for ease of grinding away said bevelled edges for maintaining sharp cutting edges.

2. A machine for slitting at high speed a continuously travelling paper web comprising,
   a circular slitter blade with a radial planar side surface and a bevelled surface inclined radially inwardly away from said side surface,
   a thin hard layer of abrasion resistant material selected from the group of tungsten carbide and aluminum oxide surface bonded to said side surface and extending in a uniform thickness layer to the edge thereof to form a cutting edge where the side surface meets the bevelled surface,
   means for rotatably supporting the slitter blade,
   a cylindrical slitter band having a cylindrical outer surface and an axially inwardly bevelled end surface,
   a thin hard layer of abrasion resistant material selected from the group of tungsten carbide and aluminum oxide surface bonded to said outer surface and extending in a uniform thickness layer to the edge thereof to form a cutting edge where the cylindrical surface joins the bevelled end surface,
   means for rotatably supporting the slitter band on an axis parallel to the slitter blade with the cutting edges overlapping for slitting the travelling web with said cylindrical surface providing a support for a web moving tangent thereto,
      said bevelled edges of said slitter blade and said band formed of a relatively soft material for wearing away with rotation of the blade and band and the action of the cut edges of the paper web to maintain a sharp cutting edge at the edge of said hard layers on the blade and band and for ease of grinding away said bevelled edges for maintaining sharp cutting edges.

3. A machine for slitting at high speed a continuously traveling paper web comprising,
   a circular slitter blade with a radial planar side surface and a bevelled surface inclined radially inwardly away from said side surface,
   a thin hard layer of abrasion resistant material surface bonded to said side surface and extending in a uniform thickness layer to the edge thereof to form a cutting edge where the side surface meets the bevelled surface,
   means for rotatably supporting the slitter blade,
   a cylindrical slitter band having a cylindrical outer surface and an axially inwardly bevelled end surface,
   a thin hard layer of abrasion resistant material surface bonded to said outer surface and extending in a uniform thickness layer to the edge thereof to form a cutting edge where the cylindrical surface joins the bevelled end surface,
   means for rotatably supporting the slitter band on an axis parallel to the slitter blade with the cutting edges overlapping for slitting the travelling web with said cylindrical surface providing a support for a web moving tangent thereto,
      said bevelled edges of said slitter blade and said band formed of straight carbon steel being relatively soft for wearing away with rotation of the blade and band and the action of the cut edges of the paper web to maintain sharp cutting edges at the edges of said hard layers on the blade and band and for ease of grinding away said bevelled edges for maintaining sharp cutting edges.

4. A machine for slitting at high speed a continuously travelling paper web comprising,
   a circular slitter blade with a radial planar side surface and a bevelled surface inclined radially inwardly away from said side surface,
   a thin hard layer of abrasion resistant material surface bonded to said side surface and extending in a uniform thickness layer to the edge thereof to form a cutting edge where the side surface meets the bevelled surface,
   means for rotatably supporting the slitter blade,
   a cylindrical slitter band having a cylindrical outer surface and axially inwardly bevelled end surfaces at each end,
   a thin hard layer of abrasion resistant material extending inwardly from each end surface of the slitter band and surface bonded to the outer surface and being in a uniform thickness layer to the edges of the band to form cutting edges at each end where the cylindrical surface joins the bevelled end surfaces,
   means for rotatably supporting the slitter band on an axis parallel to the slitter blade with the cutting edge of the blade and the cutting edge at one end of the band overlapping for slitting the travelling web with the cylindrical surface providing a support for a web moving tangent thereto,
   the other edge of the band providing an additional cutting edge,
      said bevelled edges of said slitter blade and said band formed of a relatively soft material for wearing away with rotation of the blade and band and the action of the cut edges of the paper web to maintain sharp edges at the edges of said hard layers on the blade and band and for ease of grinding away said bevelled edges for maintaining sharp cutting edges.

5. A machine for slitting at high speed a continuously travelling paper web comprising, a circular slitter blade with a radial planar side surface and a bevelled surface inclined radially inwardly away from said side surface,
a thin hard layer of abrasion resistant material of substantially 0.001 inch thick deposited on and surface bonded to said side surface and extending in a uniform thickness layer to the edge thereof to form a cutting edge where the side surface meets the bevelled surface,
means for rotatably supporting the slitter blade,
a cylindrical slitter band having a cylindrical outer surface and an axially inwardly bevelled end surface,
a thin hard layer of abrasion resistant material of substantially 0.001 inch thick deposited on and surface bonded to said outer surface and extending in a uniform thickness layer to the edge thereof to form a cutting edge where the cylindrical surface joins the bevelled end surface,
means for rotatably supporting the slitter band on an axis parallel to the slitter blade with the cutting edges overlapping for slitting the travelling web with said cylindrical surface providing a support for a web moving tangent thereto,
said bevelled edges of said slitter blade and said band formed of a relatively soft material for wearing away with rotation of the blade and band and the action of the cut edges of the paper web to maintain a sharp cutting edge at the edge of said hard layers on the blade and band and for ease of grinding away said bevelled edges for maintaining sharp cutting edges.

6. A machine for slitting at high speed a continuously travelling paper web comprising,
a circular slitter blade with a radial planar side cutting surface and a bevelled surface inclined radially inwardly away from the side surface,
means for rotatably supporting the slitter blade,
a cylindrical slitter band having a cylindrical outer cutting surface and an axially inwardly bevelled end surface,
means for rotatably supporting the slitter band on an axis parallel to the slitter blade with the edges of the cutting surfaces overlapping for slitting the travelling web with said cylindrical surface providing a support for the web moving tangent thereto,
at least one of said cutting surfaces having a thin hard layer of abrasion resistant material surface bonded to the surface and extending in a uniform thickness layer to the edge thereof to form a cutting edge where it meets its adjoining bevelled surface, the adjoining bevelled surface being formed of a relatively soft material for wearing away with rotation of the blade and band and the action of the cut edges of the paper web to maintain a sharp cutting edge and for ease of grinding away the bevelled edge for maintaining a sharp cutting edge.

References Cited in the file of this patent
UNITED STATES PATENTS

| | | |
|---|---|---|
| 852,964 | Koegel | May 17, 1907 |
| 1,904,568 | Taylor | Apr. 18, 1933 |
| 2,019,934 | Schroter | Nov. 5, 1935 |
| 2,571,201 | Clem | Oct. 16, 1951 |
| 2,645,471 | King | July 14, 1953 |
| 2,796,898 | Beyerstedt | June 25, 1957 |
| 2,867,137 | Joy | Jan. 6, 1959 |
| 2,894,583 | Johnstad | July 14, 1959 |